No. 752,792. PATENTED FEB. 23, 1904.
H. MOYA.
TYPE WRITING MACHINE.
APPLICATION FILED JAN. 10, 1902.
NO MODEL. 7 SHEETS—SHEET 5.
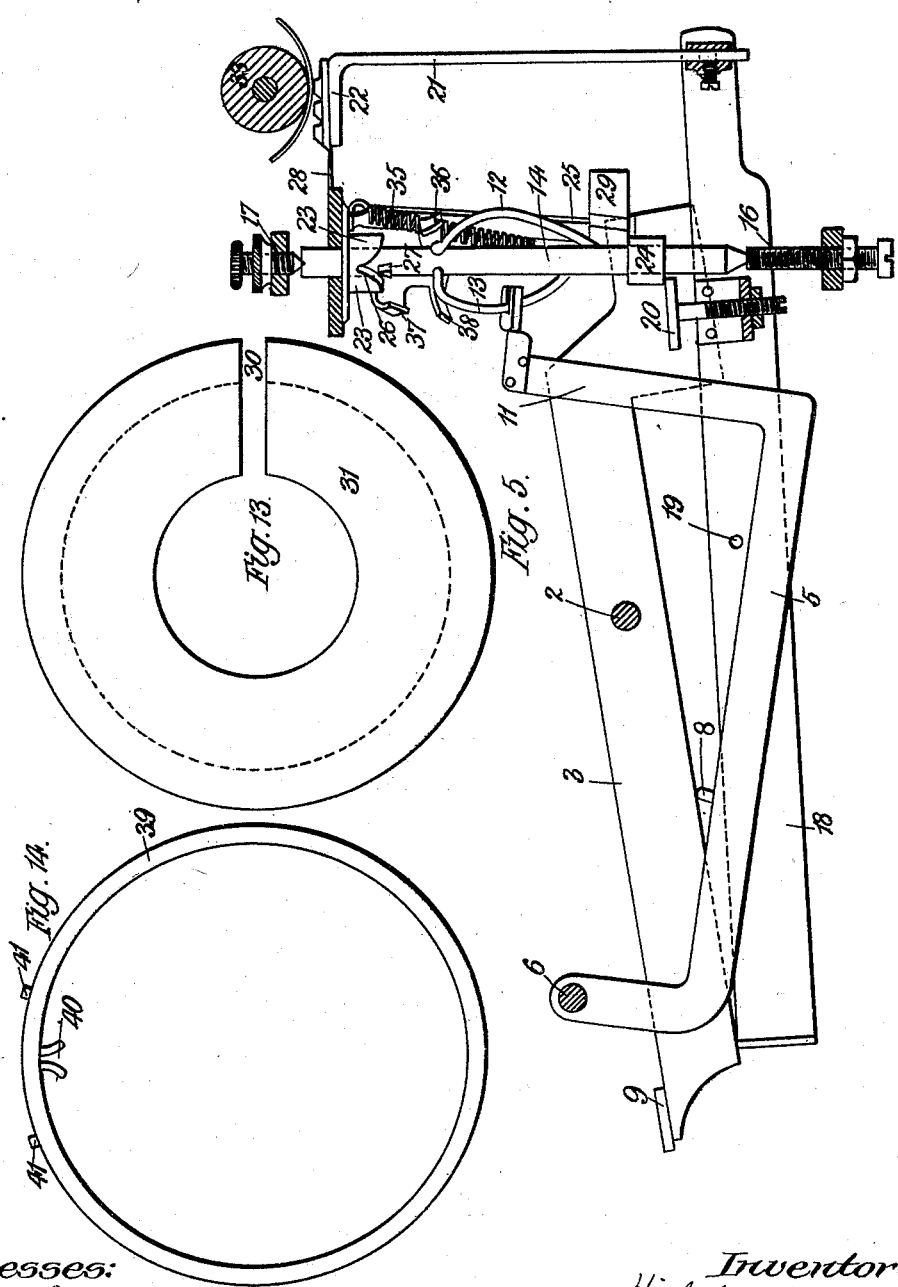
Witnesses:
G. A. Rockwell
C. B. Maynadier
Inventor:
Hidalgo Moya
by J. E. Maynadier
Attorney.

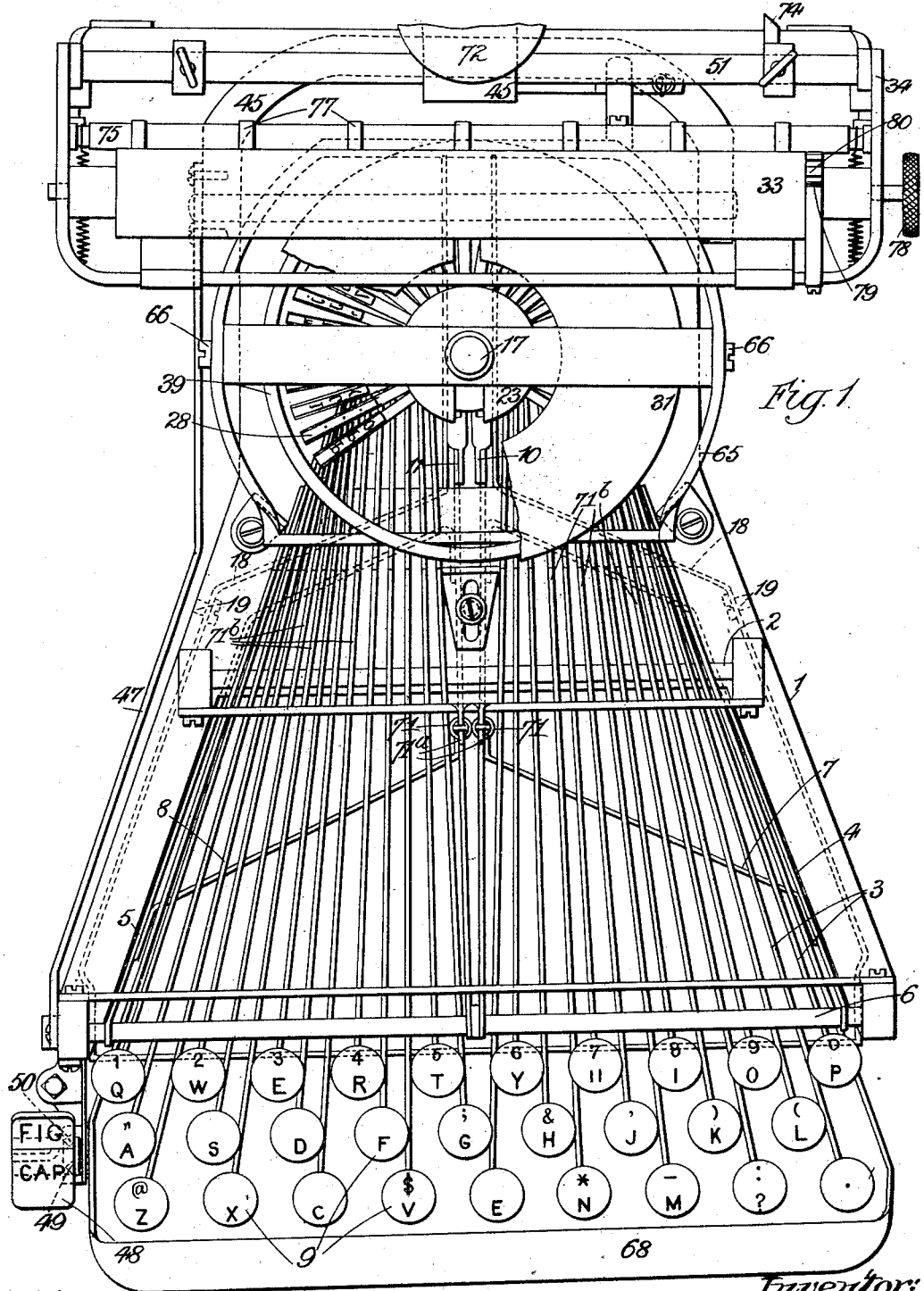

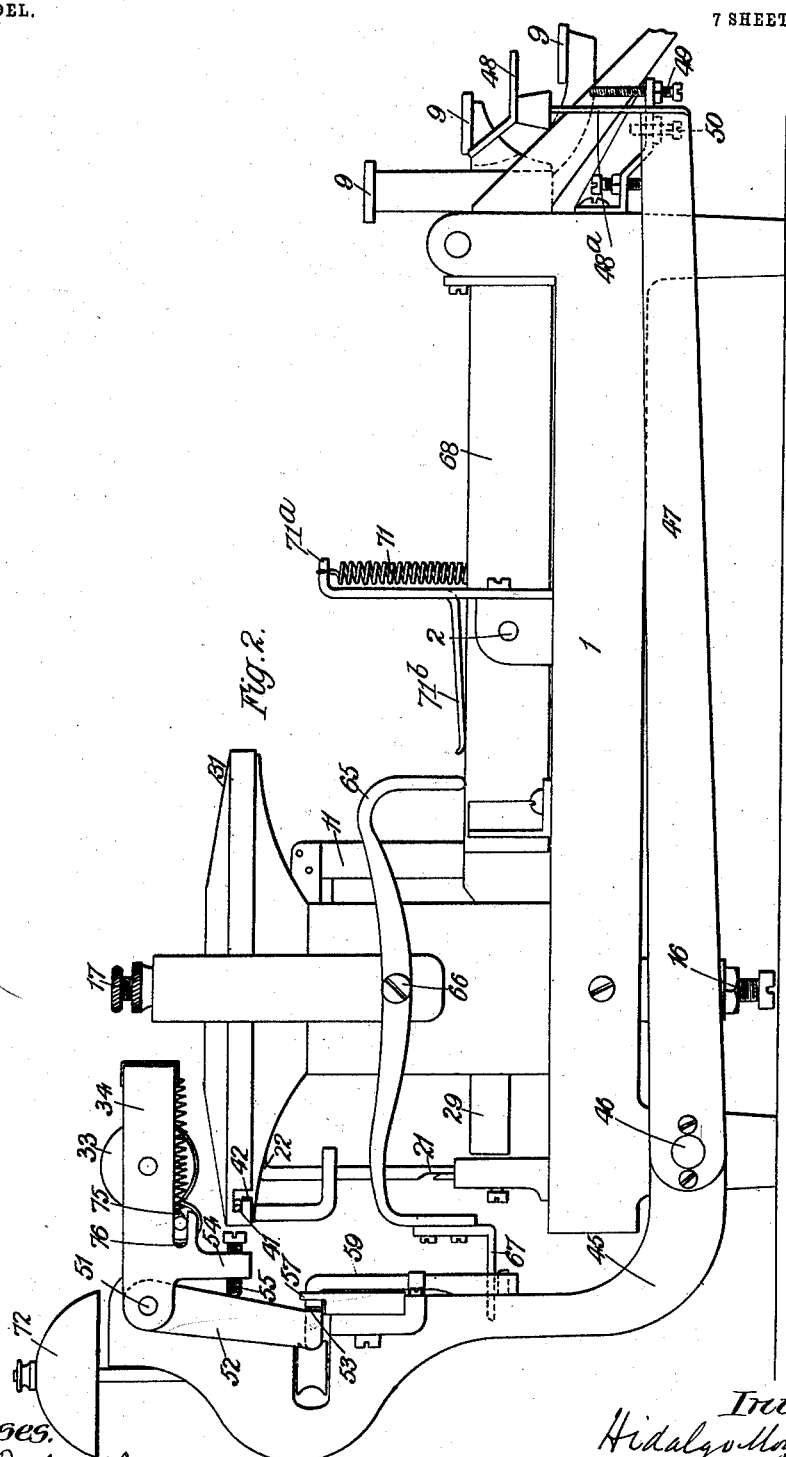

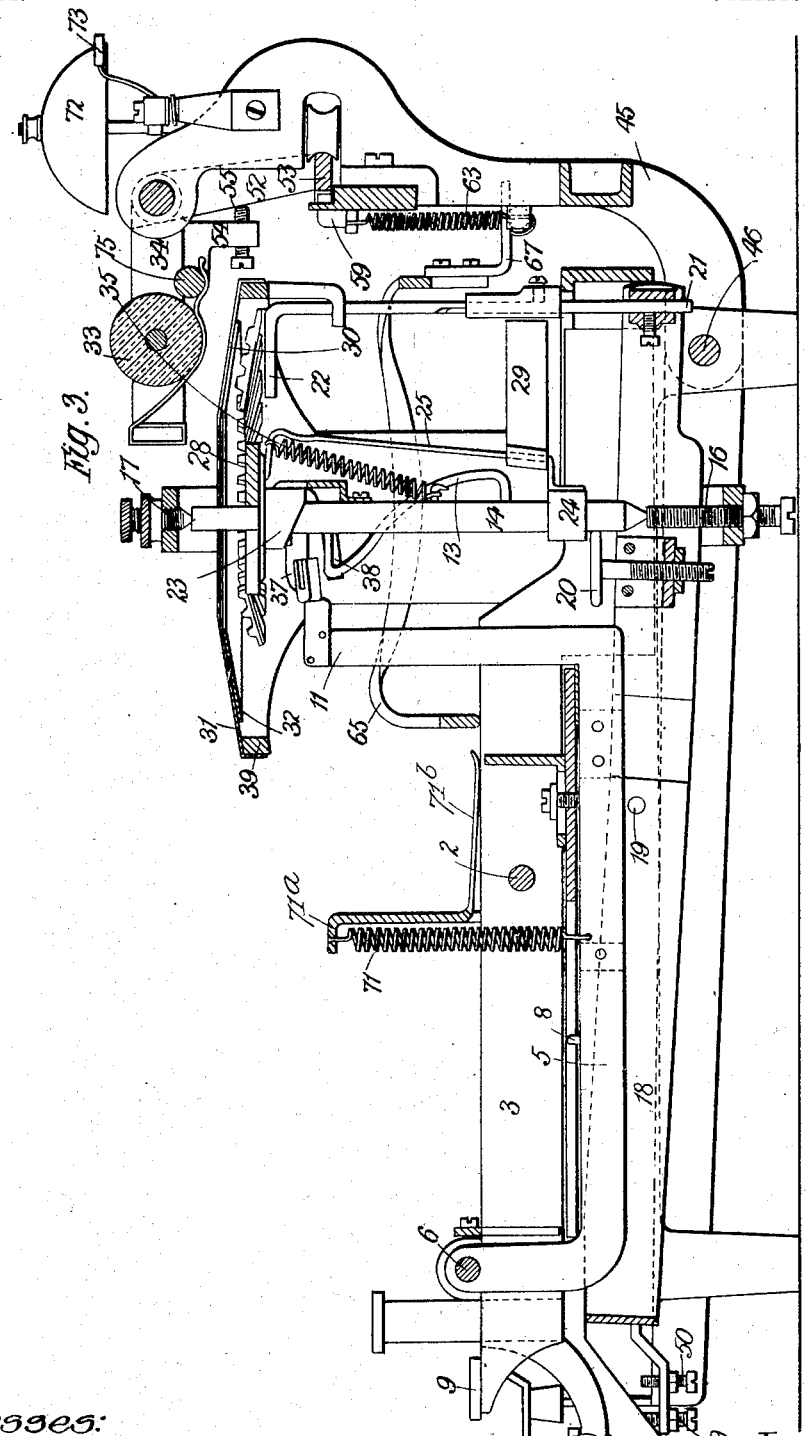

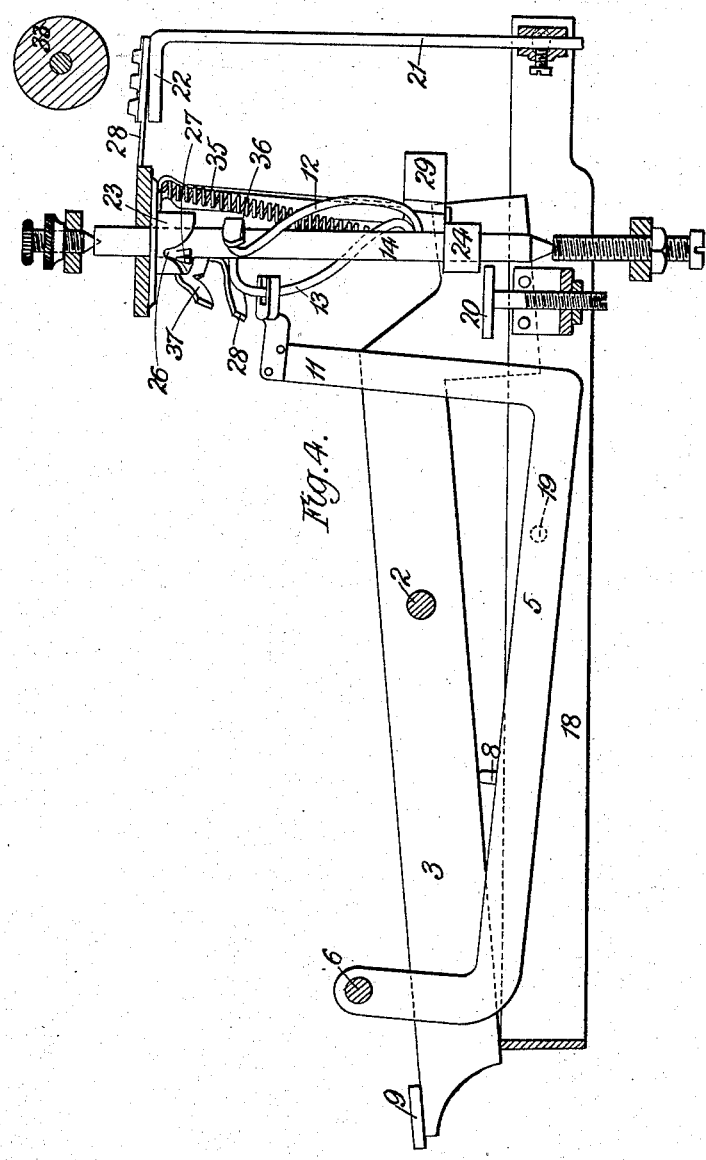

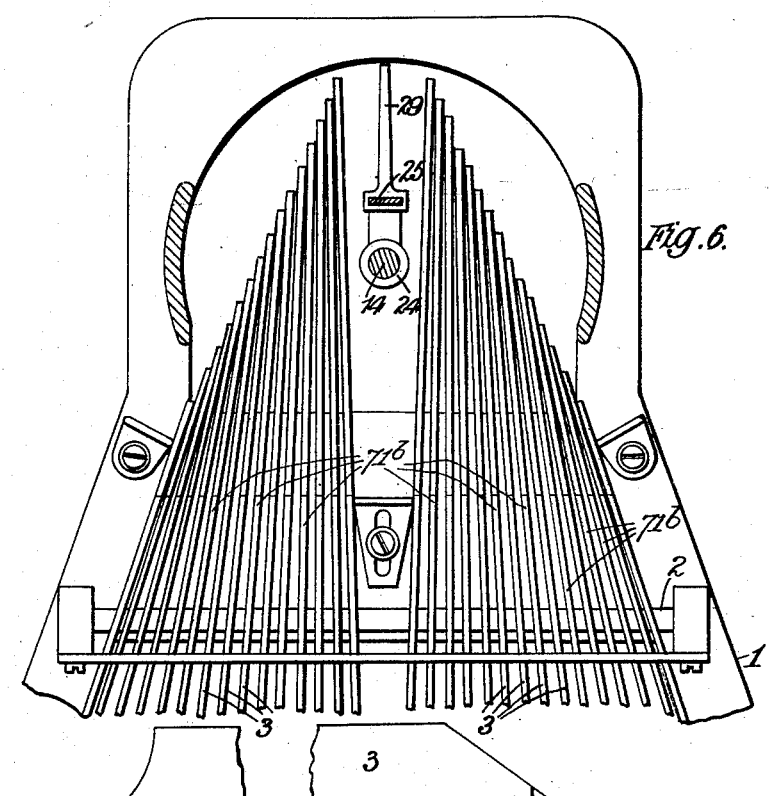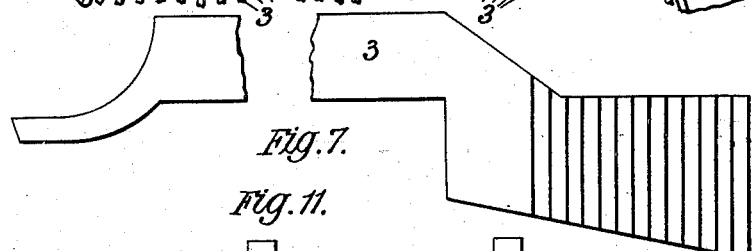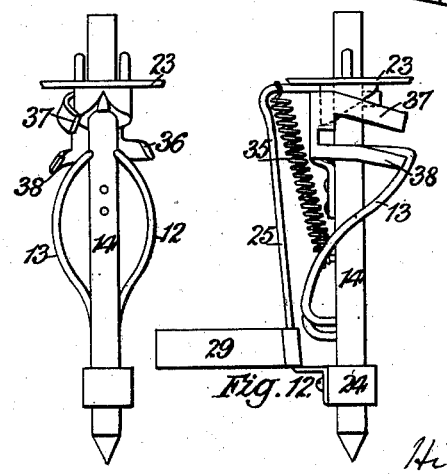

No. 752,792. PATENTED FEB. 23, 1904.
H. MOYA.
TYPE WRITING MACHINE.
APPLICATION FILED JAN. 10, 1902.
NO MODEL. 7 SHEETS—SHEET 7.
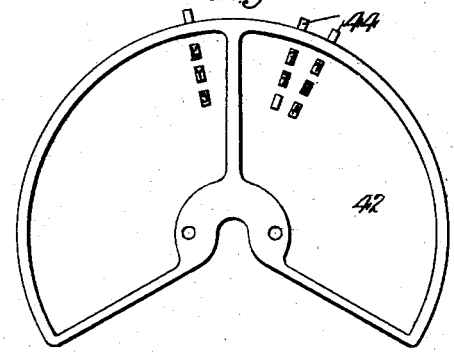
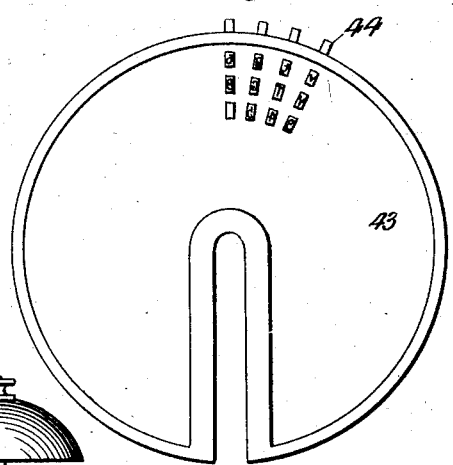
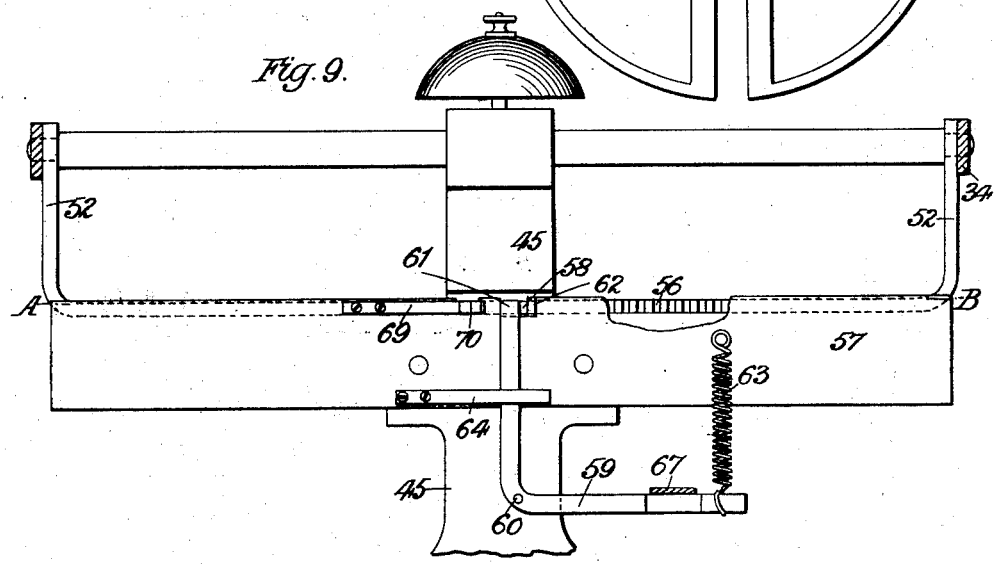
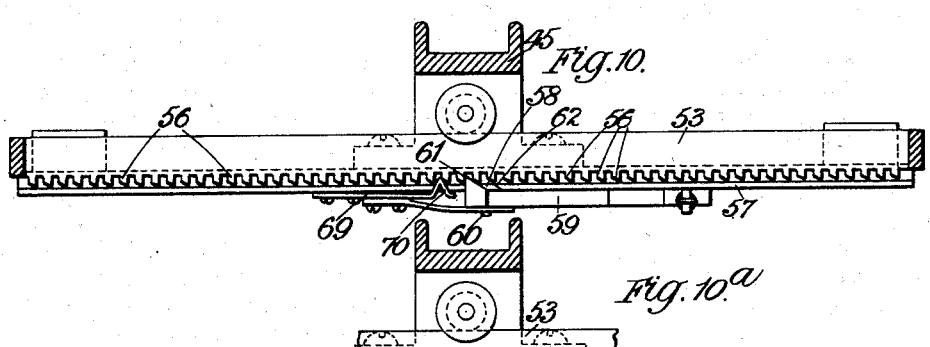
Witnesses:
G. A. Rockwell.
C. B. Maynadier.
Inventor:
Hidalgo Moya
by J. E. Maynadier
Attorney.

No. 752,792. Patented February 23, 1904.

UNITED STATES PATENT OFFICE.

HIDALGO MOYA, OF LEICESTER, ENGLAND, ASSIGNOR OF ONE-HALF TO JOHN GORDON CHATTAWAY, OF LEICESTER, ENGLAND.

TYPE-WRITING MACHINE.

SPECIFICATION forming part of Letters Patent No. 752,792, dated February 23, 1904.

Application filed January 10, 1902. Serial No. 89,168. (No model.)

*To all whom it may concern:*

Be it known that I, HIDALGO MOYA, (commonly known as DALGO MOYA,) inventor, a citizen of the United States, residing at 67 Western road, Leicester, in the county of Leicester, England, have invented certain new and useful Improvements Relating to Type-Writing Machines, of which the following is a specification.

My invention is an improved type-writing machine, and its features are—

First. The arrangement of the types in a plurality of circular rows and the paper-carriage so that it may be brought opposite any one of those rows, whereby any type in either of those rows may be selected by the proper angular movement of the type-carrier and the sidewise movement of the paper-carriage. I have shown the types arranged in three circular rows and in a sufficient number of crossing rows to include all the characters desired; but the gist of the matter is that each crossing row of types can be selected by the angular movement of the type character while any character in any crossing row is selected by the sidewise movement of the paper-carriage.

Second. In the arrangement of the types in radial rows, each radial row being adapted to be brought under a slot in a cam-plate, and means to cause each row when brought under that slot to move through the slot into printing contact with the paper on the paper-roll.

Third. In certain combinations of mechanism below described, and particularly pointed out in the claims.

Referring to the drawings, Figure 1 is a plan of the type-writer. Fig. 2 is a side elevation of the right hand of the type-writer. Fig. 3 is a central longitudinal vertical section of the type-writer. Figs. 4 and 5 are detail views showing the coöperation of one of the key-levers with one of the hinged frames, the rocking frame, and the rotary axle. Fig. 6 is a detail view showing the arrangement of the inner ends of the key-levers and the stop-arm. Fig. 7 is a diagram of the key-levers. Figs. 8 and 8ª are plans of convenient forms of type-disks. Fig. 9 is a front elevation of the rack-bar, baffle-plate, and spring-pawl. Figs. 10 and 10ª are sections on line A B, Fig. 9. Figs. 11 and 12 are front and side elevations, respectively, of the rotary axle, the type-disk collars, and stop-arm. Fig. 13 is a plan of the cover-plate. Fig. 14 is a plan of a ring for supporting said cover-plate.

1 is the frame of the machine, having a transverse bar 2, to which the key-levers 3 are pivoted.

4 and 5 are the hinged frames pivoted to a transverse rod 6, carried by the frame 1 and having diagonal bars 7 and 8, upon which the key-levers bear when depressed by their keys 9, as hereinafter explained. These key-levers are arranged in two sets, the set on the left-hand side of the machine coöperating with the bar 8 of the frame 5 and the set on the right-hand side of the machine coöperating with the bar 7 of the frame 4. The inner ends of the hinged frames 4 and 5 carry arms 10 and 11, having forked ends adapted to respectively engage with helical or inclined rods 12 and 13, carried by the rotary axle 14, supported in the frame of the machine by adjustable screw-bearings 16 17. As the key-levers are depressed they also depress one or other of the hinged frames 4 or 5, thereby causing the forked end of one or other of the arms 10 or 11 to travel down one of the helical rods 12 or 13, and thus partially rotate the axle 14. The key-levers are all depressed to the same extent; but the hinged frames and their arms 10 and 11 are depressed to a different extent by each key-lever, owing to the fact that the key-levers strike the bars 7 or 8 at different distances from the fulcrum 6 of said frames. Thus each key-lever rotates the rotary axle to a different extent.

18 is the rocking frame, pivoted at 19 to the frame of the machine and having its outer end comprising a bar lying in the path of the key-levers. The inner side of the rocking frame 18 carries an adjustable screw-disk 20 and its inner end carries a vertical rod 21, provided at its upper end with the presser-foot 22 for coöperating with the type, as hereinafter explained.

23 and 24 are collars loosely mounted on the rotary axle 14 and connected by the rigid arm 25. The collar 23 is provided with a recess 26, which has inclined sides and engages with a fixed pin 27 on the rotary axle 14. The collar 23 also carries the radial arms 28, each of which carries a row of three type. The inner ends of the key-levers are arranged to terminate in diagonal lines, as shown in Fig. 6, and the bar 25 carries a stop-arm 29, whereby as the outer end of a key-lever is depressed and its inner end raised the arm 29 (being carried round by the axle 14) strikes said key-lever, and thereby insures that the rotary movement of the collars 23 or 24 shall stop at the correct position to bring the required one of the type-arms 28 opposite a radial slot 30 in the cover-plate 31. After a type-arm has been brought opposite the slot 30 in the cover-plate 31 the key-lever in its descent depresses the outer end of the rocking frame 18 and raises the inner side of said frame, thereby causing the disk 20 to strike the collar 24 and raise the collar 23 out of engagement with the pin 27, causing all the type-arms (except the one opposite the slot 30) to come into contact with an ink-pad 32 on the under side of the cover-plate. The presser-foot 22 then rises and presses the type-arm opposite the slot 30 through said slot, causing it to print upon the paper on the paper-cylinder 33, as shown in Fig. 5. When the key-lever descends, so as to depress the outer end of the rocking-frame 18, as above described, one of the hinged frames 4 or 5 is also further depressed, and the axle 14 is thereby further rotated after the required type has been brought opposite the slot 30 and after the stop-arm 29 has struck the said key-lever, and thereby prevented any further rotary movement of the collar 23. When this further rotary movement of the axle occurs, the pin 27 carried by the axle 14 bears upon one of the inclined sides of the recess 26, and thereby assists in raising the collar 23 and the type-arms.

The forked end of the arm 11 carried by the frame 5 is operated by the key-levers on the left side of the machine and by coöperating with the inclined rod 13 turns the axle 14 toward the left, while the forked end of the arm 10 carried by the frame 4 is operated by the key-levers on the right-hand side of the machine and by coöperating with the incline 12 turns the axle 14 toward the right.

35 is a spring which has its ends respectively attached to the upper end of the arm 25 and to a lug on the axle 14 and is for the purpose of returning the collar 23 and the type-arms to their normal position after each operation. To insure that the axle 14 shall come to rest in the correct position after each operation, a stop-arm 36 carried by the axle 14 is adapted to strike the forked end of the arm 10 as the axle returns toward the right after having been operated by the arm 11, while a similar stop-arm 37 carried by the axle 14 is adapted to strike the forked end of the arm 11 as the axle 14 returns toward the left after having been operated by the arm 10. When the axle 14 is rotated toward the right by the arm 10, the stop-arm 36 (by passing beneath the forked end of the arm 11) prevents the accidental movement of said arm, and when the axle 14 is rotated toward the left by the arm 11 a stop-arm 38, carried by the axle 14, passes beneath the forked end of the arm 10, and thereby prevents the accidental operation of said arm.

As shown in Fig. 7, the inner ends of each succeeding key-lever from the center toward the outside of the machine is of greater depth than the inner end of the immediately preceding key-lever. This insures that the inner end of no key-lever can be lifted clear of the adjacent key-levers, thereby insuring the smooth working of the key-levers.

The cover-plate 31 is supported from the frame of the machine by a ring 39, provided with a guideway 40, through which the outer ends of the radial type-arms pass when they are raised by the presser-foot 22. The ring 39 is also provided with pins 41 41, with which bayonet-slots 42 on the cover-plate 31 engage to secure said cover-plate to the ring.

The type-arms 28 may be replaced by a disk or segment of any suitable flexible substance, such as 42 in Fig. 8 or 43 in Fig. 8$^a$. These disks are secured to the collar 23 and are provided with projections 44 for engaging with the guideway 40 in the ring 39 to insure the correct position of the type to be passed through the slot 30 in the cover-plate. The resilient nature of the substance of which these disks are composed permits the presser-foot 22 to force the required type through the slot 30 in the cover-plate 31 when the remaining type are in contact with the ink-pad, as above explained.

The paper-carriage 34 is carried by a support 45, pivoted at 46 to the frame of the machine. The position of the paper-carriage is such that the paper-cylinder 33 is normally situated above the outermost type of the radial row, carried by each type-arm or by a type-disk, as said row is brought opposite the slot 30.

47 is the shifting-lever connected to the support 45 and to the free end of which a key 48 is connected by a flexible piece 48$^a$. By depressing the key 48 onto a stop 49 the support 45 is moved angularly about its pivot, so as to bring the paper-cylinder opposite the middle type of each radial row, and by bending the piece 48$^a$ and then depressing the key 48 onto a stop 50 the support 45 may be moved angularly about its pivot 46, so as to bring the paper-cylinder 33 into position to be printed upon by the innermost type of each radial row.

The paper-carriage 34 is pivoted to a bar 51, adapted to slide horizontally in the support 45. From the bar 51 depend arms 52 52, which carry the rack-bar 53. An arm 54, depending from the carriage 34, carries a screw 55, the end of which bears against one of the arms 52, as shown in Figs. 2 and 3. By regulating the screw 55 the position of the paper-cylinder can be adjusted as required. The rack-bar 53 is provided with teeth 56, which each have an inclined side and a straight side.

57 is a plate which is carried by the support 45 and masks the teeth 56, except where a gap 58 is formed in said mask-plate, Figs. 9 and 10.

59 is a crank-pawl pivoted at 60 to the support 45 and having a nose 61, adapted to enter the gap 58 and to engage with the teeth 56 of the rack-bar 53. The nose 61 of the pawl has a straight side which engages with the straight sides of the teeth 56 and has also an inclined side situated toward the inclined sides of the teeth 56 and also toward an incline 62 at one side of the gap 58. A spring 63 tends to hold the nose 61 of the pawl against the straight side of the gap 58 in the plate 57. In addition to a rocking movement about its pivot the pawl 59 is also capable of moving along its pivot, but is normally held in engagement with the teeth 56 of the rack-bar 53 by a spring 64, carried by the bar 57.

A frame 65, Figs. 1, 2, and 3, pivoted at 66 to the machine, carries a foot 67, which engages with the horizontal arm of the pawl 59. When a type-lever is operated, it moves the frame 65 about its pivot so as to depress the foot 67, and thereby rock the pawl 59 about its pivot, thus causing the inclined side of the nose of the pawl to bear upon the inclined side of a tooth 56, and thereby move the pawl outwardly along its pivot against the resistance of the spring 64 until the nose of the pawl is disengaged from the said teeth, Fig. 10ª. The nose of the pawl is then moved toward the right, Figs. 9 and 10, through the distance equal to the width of one tooth and is then moved into engagement with the rack by the spring 64. When the key-lever is released, the spring 63 returns the pawl to its normal position, thus feeding the paper-carriage one step forward.

The machine is provided with a spacer-bar 68, by operating which the pivoted frame 65 and pawl 59 may be actuated for feeding forward the paper-carriage without printing on the paper, as is well understood.

When the paper-carriage is pressed toward the left, referring to Figs. 9 and 10, the inclined sides of the teeth 56 engage with the inclined side of the pawl-nose 61, and thereby throw the pawl out of engagement with the rack, and when the paper-carriage is pressed toward the right, referring to Figs. 9 and 10, the inclined face of the pawl-nose 61 engages with the incline 62 on the plate 57, thereby throwing the pawl out of engagement with the rack. It will thus be seen that the paper-carriage may be readily moved in either direction transversely of the machine by hand.

A spring 69, secured to the plate 57, carries a V-shaped tooth 70, which passes through an opening in the plate 57 and engages with the rack-teeth to prevent the paper-carriage being accidentally moved in the wrong direction when the key-levers are operated.

The key-levers and the hinged frames 4 and 5 are returned to their normal positions after being operated, the latter by springs 71 and the former each by its individual spring $71^b$. The springs 71 are fast at one end to the frames 4 and 5, respectively, and at the other end to a fixed bar $71^a$, and the springs $71^b$ are spring-fingers attached to bar $71^a$ and which bear each on its key-lever. The rocking frame 18 returns by gravity to its normal position after being operated.

The mechanism above described for moving the paper-roller carriage from the right toward the left of the machine with a step-by-step movement as the type key-levers are operated and which permits the paper-carriage to be pushed rapidly by hand in both directions is not claimed in this application, as it forms the subject-matter of my application filed June 16, 1902, Serial No. 111,805.

The operation of the type-writer, referring to one of the key-levers on the left-hand side of the machine, is as follows: When a key-lever 3 is operated by depressing its finger-key, it strikes the diagonal bar 8 of the hinged frame 5, depressing said hinged frame to an extent dependent upon the position of the key-lever on the said diagonal bar. The forked end of the arm 11 is thus caused to travel down along the helical rod 13, and thereby move the axle 14, with the collars 23 and 24, angularly about its longitudinal axis to such an extent as to bring the required type-arm 28 or the required row of type on the flexible disk opposite the slot 30 in the cover-plate 31, the stop-arm 29 striking the inner end of the key-lever 3 to insure that the collar 23 and type-arms or disk shall not move too far. This is shown clearly in Fig. 4. Toward or at the end of its stroke the key-lever 3 then strikes the rocking bar 18, as shown in Fig. 5, thereby moving said rocking bar about its pivot 19 and causing first the disk 20 to strike the collar 24, so as to raise the collars 23 24 out of engagement with the pin 27 on the axle 14, and raise all the type with the exception of the row opposite the slot 30 into contact with the inking-pad 32. The inner end of the rocking bar 18 then raises the rod 21 and presser-foot 22, so as to cause said presser-foot to thrust the type opposite the slot 30 through the said slot and cause it to print upon the paper carried by the paper-cylinder 33. During the operation of the rocking bar 18, as above described, the hinged frame 5 is further depressed by the key-lever, and the end of the arm 11 (by traveling farther down the rod 13) further rotates the axle 14. The stop-arm 29, however, prevents any further rotary movement of the collar 23 and type-arms or type-disk, so that as the axle 14 thus continues to rotate the pin 27 bears upon one of the inclined sides of the recess 26, and thereby assists in raising the collar 23 toward the ink-pad, while permitting the axle 14 to continue to freely rotate. The key-lever also simultaneously operates the pivoted frame 65, so as to cause the nose 61 of the pawl 59 to engage with a fresh tooth on the rack-bar 53, as above described. When the key-lever 3 is released, the various parts are returned to their original positions and the pawl 59 feeds the paper-carriage forward into position for the paper to receive the next printed character.

The support 45 may carry the usual alarm-gong 72, adapted to be struck by a spring hammer or striker 73, operated by a projection 74, Fig. 1, on the paper-carriage as the latter nears the end of every line.

The paper is held in contact with the paper-cylinder 33 by a presser-roller 75, journaled in slots 76 in the paper-carriage 34. The roller 75 is preferably provided with resilient bands or rings 77, which bear upon the paper-cylinder 33.

The paper-cylinder 33 is provided with a finger-piece 78 for rotating it about its longitudinal axis and is prevented from moving accidentally by a spring-tooth 79, carried by the paper-carriage 34 and adapted to engage with a toothed rack 80 on the paper-cylinder, as is well understood.

What I claim, and desire to secure by Letters Patent of the United States, is—

1. A type-writer comprising a type-carrier, on which the type are arranged in circular rows about an axle and also in crossing rows each on a flexible radial arm of said axle; means for moving the flexible radial arms of the type-carrier angularly to bring the desired crossing row of type in a line crossing the paper-carriage; that paper-carriage; and means for moving it sidewise to bring it in printing relation to a type in one of the crossing-rows.

2. In a type-writing machine, the combination with the key-levers and paper-carriage, of a rotary axle, a collar on said axle, resilient type-supports carried by said collar, type arranged radially on said supports, a cover-plate for said type having a radial slot, an ink-pad on the cover-plate, means to rotate the said axle through such an angle as to bring the required type opposite said slot when the key-levers are operated, means for moving the collar along the axle to bring the type in contact with the ink-pad, means for moving the type opposite the slot in the cover-plate through said slot, and means to feed the paper-carriage forward, substantially as described for the purpose specified.

3. In a type-writing machine, the combination with the key-levers and paper-carriage, of a rotary axle, a collar on said axle, resilient type-supports carried by said collar, type arranged radially on said supports, a cover-plate for said type having a radial slot, an ink-pad on the cover-plate, means to rotate the said axle through such an angle as to bring the required type opposite said slot when the key-levers are operated, means for insuring the stoppage of the collar when the type corresponding to the key-lever that has been operated is opposite the slot in the cover-plate, means for moving the collar along the axle to bring the type in contact with the ink-pad, means for moving the type opposite the slot in the cover-plate through said slot, and means to feed the paper-carriage forward, substantially as described for the purpose specified.

4. In a type-writing machine, the combination of the paper-carriage, key-levers having their inner ends terminating on diagonal lines receding from the center toward the sides of the machine, a rotary axle, a collar at the upper end of said axle, a collar on the lower end of said axle, a bar rigidly connecting said collars, resilient type-supports carried by said upper collar, type arranged radially on said supports, a cover-plate for said type having a radial slot, an ink-pad on the cover-plate, means to rotate said axle through such an angle as to bring the required type opposite said slot in the cover-plate when the key-levers are operated, a stop-arm carried by the bar connecting the collars and adapted to strike the inner end of the key-lever that has been operated, means for moving the collars along the axle to bring the type in contact with the ink-pad, means for moving the type opposite the slot through said cover-plate, and means to feed the paper-carriage forward, substantially as described for the purpose specified.

5. In a type-writing machine, the combination of the paper-carriage, pivoted key-levers, a rotary axle, a collar mounted on said axle and having a recess with inclined sides, a pin fixed to the axle and engaging with the recess in the collar, resilient type-supports carried by said collar, type arranged radially on said supports, a cover-plate for said type having a radial slot, an ink-pad on said cover-plate, means to rotate said axle through such an angle as to bring the required type opposite said slot when the key-levers are operated, means for moving the collar along the axle to bring the type in contact with the ink-pad, means for moving the type opposite the slot in the cover-plate through said slot, and means to feed the paper-carriage forward, substantially as described for the purpose specified.

6. In a type-writing machine, the combination of the paper-carriage, pivoted key-levers having their inner ends terminating on diagonal lines receding from the center toward the sides of the machine, a rotary axle, a collar mounted on the upper end of said axle and having a recess with inclined sides, a pin fixed to the axle and engaging with the recess in said collar, a collar mounted on the lower end of said axle, a bar rigidly connecting said collars resilient type-supports carried by the said upper collar, type arranged radially on said supports, a cover-plate for said type having a radial slot, an ink-pad on said cover-plate, means for rotating said axle through such an angle as to bring the required type opposite said slot when the key-levers are operated, a stop-arm carried by the bar connecting the collars and adapted to strike the inner end of the key-lever that has been operated, means for moving the collars along the axle to bring the type in contact with the ink-pad, means for moving the type opposite the slot through said cover-plate, and means to feed the paper-carriage forward, substantially as described for the purpose specified.

7. In a type-writing machine, the combination with the key-levers and paper-carriage, of a rotary axle, a collar on said axle, resilient type-supports carried by said collar, type arranged radially on said supports, a cover-plate for said type having a radial slot, an ink-pad on the cover-plate, means to rotate the said axle through such an angle as to bring the required type opposite said slot when the key-levers are operated, a rocking frame pivoted to the machine and adapted to be operated by the key-levers so that its inner end moves the collar along the axle to bring the type in contact with the ink-pad, a presser-foot carried by the inner end of said rocking frame and adapted to press the type opposite the cover-plate slot through said slot, and means to feed the paper-carriage forward, substantially as described for the purpose specified.

8. In a type-writing machine, the combination of the paper-carriage, pivoted key-levers having their inner ends terminating on diagonal lines receding from the center toward the sides of the machine, of a rotary axle, a collar mounted on the upper end of said axle and having a recess with inclined sides, a pin fixed to the axle and engaging with a recess in said collar, a collar mounted on the lower end of said axle, a bar rigidly connecting said collars, resilient type-supports carried by the said upper collar, type arranged radially on said supports, a cover-plate for said type having a radial slot, an ink-pad on said cover-plate, means for rotating said axle through such an angle as to bring the required type opposite said slot when the key-levers are operated, a stop-arm carried by the bar connecting the collars and adapted to strike the inner end of the key-lever that has been operated, a rocking frame pivoted to the frame of the machine and adapted to be operated by the key-levers, an adjustable stop located on the inner side of said rocking frame and adapted to strike the collar on the lower end of the axle to move the type into contact with the ink-pad, a presser-foot carried by the inner end of said rocking frame and adapted to press the type opposite the cover-plate slot through said slot, and means to feed the paper-carriage forward, substantially as described for the purpose specified.

9. In a type-writing machine, the combination of the paper-carriage, pivoted key-levers having their inner ends terminating on diagonal lines receding from the center toward the sides of the machine, a rotary axle, helical rods carried by said axle, a collar mounted on the upper end of said axle and having a recess with inclined sides, a pin fixed to the axle and engaging with the recess in said collar, a collar mounted on the lower end of said axle, a bar rigidly connecting said collars, resilient type-supports carried by the collar on the upper end of the axle, type arranged radially on said supports, a cover-plate for said type having a radial slot, an ink-pad on said cover-plate, helical rods carried by the axle, frames hinged to the machine and adapted to be operated by the key-levers, arms carried by said hinged frames, forks located at the ends of said arms and engaging with the helical rods, a stop-arm carried by the bar connecting the collars and adapted to strike the inner end of the key-lever that has been operated, means for moving the collars along the axle to bring the type in contact with the ink-pad, means for moving the type opposite the radial slot through said slot, and means to feed the paper-carriage forward, substantially as described for the purpose specified.

10. In a type-writing machine, the combination of the key-levers, the paper-carriage, a rotary axle, type carried by said axle, a cover-plate for said type having a radial slot, helical rods carried by said axle, frames hinged to the machine, diagonal bars carried by said frames and with which the key-levers coöperate, arms carried by said hinged frames and having their ends respectively in sliding engagement with the helical rods, means operated by the key-levers moving the type opposite the radial slot through said slot, and means to feed the paper-carriage forward, substantially as described for the purpose specified.

11. In a type-writing machine, the combination of the paper-carriage, pivoted key-levers having their inner ends terminating on diagonal lines receding from the center toward the sides of the machine, a rotary axle, helical rods carried by said axle, a collar mounted on the upper end of said axle and having a recess with inclined sides, a pin fixed to the axle and engaging with the recess in said collar, a collar mounted on the lower end of said axle, a bar rigidly connecting said collars, resilient type-supports carried by the collar on the upper end of the axle, type arranged radially on said supports, a cover-plate for said type having a radial slot, an ink-pad on said cover-plate, helical rods carried by the axle, frames hinged to the machine, diagonal bars carried by said hinged frames and with which the key-levers coöperate, arms carried by said hinged frames, forks located at the ends of said arms and engaging with the helical rods, a stop-arm carried by the bar connecting the collars and adapted to strike the inner end of the key-lever that has been operated, means for moving the collars along the axle to bring the type in contact with the ink-pad, means for moving the type opposite the radial slot through said slot, and means to move the paper-carriage forward, substantially as described for the purpose specified.

12. In a type-writing machine, the combination of the key-levers, the paper-carriage, a rotary axle, a collar on said axle, resilient type-supports carried by said collar, type arranged radially on said supports, a cover-plate for said type having a radial slot, an ink-pad on the cover-plate, helical rods carried by the axle, means operated by the key-levers for coöperating with the helical rods to move the axle through such an angle as to bring the required type opposite the slot in the cover-plate when the key-levers are operated, a rocking frame pivoted to the machine and adapted to be operated by the key-levers so that its inner end moves the collar along the axle to bring the type into contact with the ink-pad, a presser-foot carried by the inner end of said rocking frame and adapted to press the type opposite the radial slot through said slot, and means to feed the paper-carriage forward, substantially as described for the purpose specified.

13. In a type-writing machine, the combination of the key-levers, the paper-carriage, a rotary axle, a collar on said axle, resilient type-supports carried by said collar, type arranged radially on said supports, a cover-plate for said type having a radial slot, an ink-pad on the cover-plate, helical rods carried by the axle, frames hinged to the machine and adapted to be operated by the key-levers, arms carried by said hinged frames and having their ends respectively in sliding engagement with the helical rods, a rocking frame pivoted to the machine and adapted to be operated by the key-levers so that its inner end moves the collar along the axle to bring the type into contact with the ink-pad, a presser-foot carried by the inner end of said rocking frame and adapted to press the type opposite the radial slot through said slot, and means to feed the paper-carriage forward, substantially as described for the purpose specified.

14. In a type-writing machine, the combination of the key-levers, the paper-carriage, a rotary axle, type carried by said axle, a cover-plate for said type having a radial slot, helical rods carried by said axle, frames hinged to the machine, diagonal bars carried by said frames and with which the key-levers coöperate, arms carried by said hinged frames and having their ends respectively in sliding engagement with the helical rods, a rocking frame pivoted to the machine and adapted to be operated by the key-levers so that its inner end moves the collar along the axle to bring the type into contact with the ink-pad, a presser-foot carried by the inner end of the rocking frame and adapted to press the type opposite the radial slot through said slot, and means to feed the paper-carriage forward, substantially as described for the purpose specified.

15. In a type-writing machine, the combination of the paper-carriage, pivoted key-levers having their inner ends terminating on diagonal lines receding from the center toward the sides of the machine, a rotary axle, a collar mounted on the upper end of said axle and having a recess with inclined sides, a pin fixed to the axle and engaging with the recess in said collar, a collar mounted on the lower end of said axle, a bar rigidly connecting said collars, resilient type-supports carried by the said upper collar, type arranged radially on said supports, a cover-plate for said type having a radial slot, an ink-pad on said cover-plate, helical rods carried by the axle, means operated by the key-levers for coöperating with the helical rods to move the axle through such an angle as to bring the required type opposite the slot in the cover-plate when the key-levers are operated, a stop-arm carried by the bar connecting the collars and adapted to strike the inner end of the key-lever that has been operated, a rocking frame pivoted to the machine and adapted to be operated by the key-levers, an adjustable stop located on the inner side of said rocking frame and adapted to strike the collar on the lower end of the axle to move the type into contact with the ink-pad, a presser-foot carried by the inner end of said rocking frame and adapted to press the type opposite radial slot, through said slot, and means to feed the paper-carriage forward, substantially as described for the purpose specified.

16. In a type-writing machine, the combination of the paper-carriage, pivoted key-levers having their inner ends terminating on diagonal lines receding from the center toward the sides of the machine, a rotary axle, a collar mounted on the upper end of said axle and having a recess with inclined sides, a pin fixed to the axle and engaging with the recess in said collar, a collar mounted on the lower end of said axle, a bar rigidly connecting said collars, resilient type-supports carried by the said upper collar, type arranged radially on said supports, a cover-plate for said type having a radial slot, an ink-pad on said cover-plate, helical rods carried by the axle, frames hinged to the machine, diagonal bars carried by said frames and with which the key-levers coöperate, arms carried by said hinged frames and having their ends respectively in sliding engagement with the helical rods, a stop-arm carried by the bar connecting said collars and adapted to strike the inner end of the key-lever that has been operated, a rocking frame pivoted to the machine and adapted to be operated by the key-levers, an adjustable stop located on the inner side of said rocking frame and adapted to strike the collar on the lower end of the axle to move the type into contact with the ink-pad, a presser-foot carried by the inner end of said rocking frame and adapted to press the type opposite the radial slot through said slot, and means to feed the paper-carriage forward, substantially as described for the purpose specified.

17. In a type-writing machine, the combination of the paper-carriage, pivoted key-levers having their inner ends terminating on diagonal lines receding from the center toward the sides of the machine, a rotary axle, a collar mounted on the upper end of said axle and having a recess with inclined sides, a pin fixed to the axle and engaging with the recess in said collar, a collar mounted on the lower end of said axle, a bar rigidly connecting said collars, resilient type-supports carried by the said upper collar, type arranged radially on said supports, a cover-plate for said type having a radial slot, an ink-pad on said cover-plate, helical rods carried by the axle, frames hinged to the machine, diagonal bars carried by said hinged frames and with which the key-levers coöperate, arms carried by said hinged frames and having their ends respectively in sliding engagement with the helical rods, a stop-arm carried by the bar connecting said collars and adapted to strike the inner end of the key-lever that has been operated, stop-arms carried by the axle and adapted to stop said axle in the correct position after each operation, a rocking frame pivoted to the machine and adapted to be operated by the key-levers, an adjustable stop located on the inner side of said rocking frame and adapted to strike the collar on the lower end of the axle to move the type into contact with the ink-pad, a presser-foot carried by the inner end of said rocking frame and adapted to press the type opposite the radial slot through said slot, and means to feed the paper-carriage forward, substantially as described for the purpose specified.

18. In a type-writing machine, the combination of a paper-carriage, key-levers having their ends terminating on diagonal lines receding from the center toward the sides of the machine, the inner end of each succeeding key-lever from the center toward the sides of the machine increasing in depth, a rotary axle, a collar on said axle, resilient type-supports carried by said collar, type arranged radially on said supports, a cover-plate for the type having a radial slot, an ink-pad on the cover-plate, means operated by the key-levers to rotate said axle through such an angle as to bring the required type opposite the radial slot, means for insuring the stoppage of the collar when the type corresponding to the key-lever that has been operated is opposite the slot in the cover-plate, means for moving the collar along the axle to bring the type in contact with the ink-pad, means for moving the type opposite the slot in the cover-plate through said slot, and means to move the paper-carriage forward, substantially as described for the purpose specified.

In testimony whereof I have hereunto set my hand, in presence of two subscribing witnesses, this 23d day of December, 1901.

HIDALGO MOYA.

Witnesses:
J. ATKINS,
ARCHIBALD SMITH.